J. J. Laubach.

Grooving Mach.

No. 3,466. Reissued May 25, 1869.

UNITED STATES PATENT OFFICE.

THE S. STOW MANUFACTURING COMPANY, OF PLANTSVILLE, CONNECTICUT, ASSIGNEES OF J. J. LAUBACH

IMPROVEMENT IN MACHINES FOR PRESSING THE LOCKS OF SHEET-METAL PLATES.

Specification forming part of Letters Patent No. 16,337, dated January 6, 1857; Reissue No. 3,466, dated May 25, 1869.

*To all whom it may concern:*

Be it known that J. J. LAUBACH, of Easton, in the county of Northampton and State of Pennsylvania, invented a new and improved Machine for Forming Joints for Sheet Metal; and we do hereby declare that the following is a full and exact description thereof, reference being had to the original drawings, making a part of this specification, in which—

Figure 1:
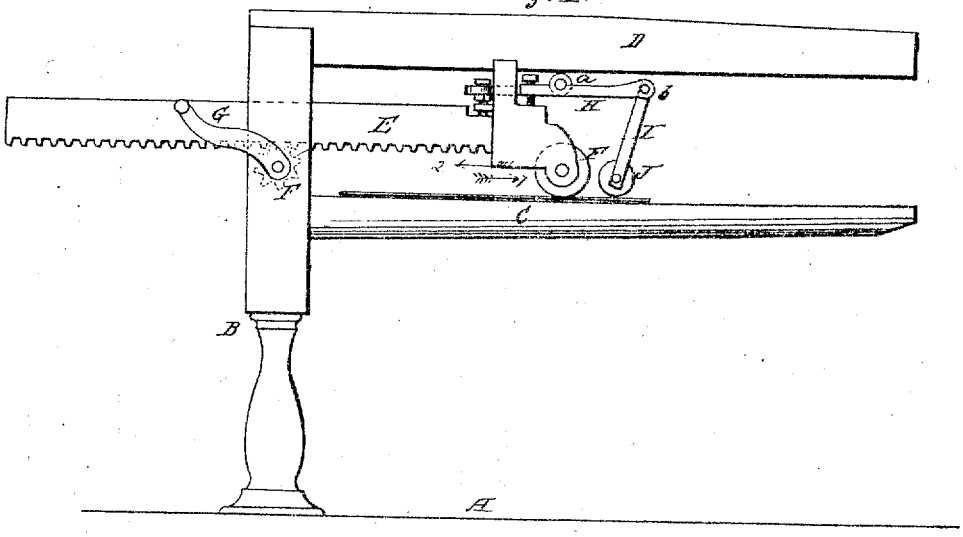
Figure 2:
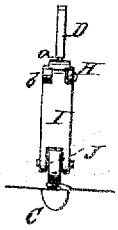

Figure 1 is a side view of his improvement. Fig. 2 is an end view of the same.

Similar letters of reference indicate like parts.

His invention consists in attaching a pressure-roller to the ordinary grooving-machine, (used for closing the locks of sheet-metal plates,) for rolling down the seams, and arranged in such manner that the said pressure-roller moves simultaneously with the groover roller, whereby the locks are pressed immediately after being closed and before the plates are removed from the machine.

A represents a base, to which an upright, B, is attached, and C represents a horizontal bar attached to the upright B, said bar forming the bed on which the locks of the plates are placed.

D represents a horizontal bar attached to the upper end of the upright B, the bar D being parallel with the bar C.

E represents a rack-bar, which works through the upright B. This rack has a roller, F, fitted in one end of it, the periphery of said roller being grooved and resting upon the bar C. A pinion, F', gears into the rack E, said pinion being fitted in the upright B, and having its axis extending through the upright, and a crank, G, attached to its end.

H represents a horizontal arm attached to the end of the rack-bar E, above the roller F. This arm has a friction-roller, *a*, placed upon it, said roller bearing against the under surface of the bar D.

To the outer end of the arm H a pendent bar, I, is connected by a hinge or joint, *b*, said hinge or joint being a stop-hinge, and so formed that the bar I is allowed to swing inward or toward the upright B, but not outward or from it. To the lower end of the bar I a roller, J, is fitted.

The operation is as follows: The edges of the sheet-metal plates (shown in blue) are bent in the usual manner by any of the machines now used for that purpose, and the edges of the sheets or plates being locked, the lock is placed upon the bar C, the roller F being previously moved back near the upright B. The roller F is then moved forward, or in the direction indicated by arrow 1, and the edges of the roller bear upon the sheets or plates at each side of the lock and close it, the roller J not pressing or acting in consequence of the bar I being allowed to move inward. When the lock is closed its whole length, the motion of the rack-bar E is reversed, and as the bar moves backward, or in the direction of arrow 2, the roller J bears upon the upper surface of the lock and compresses it.

The rack-bar E and roller F, arranged as herein shown, are well known and commonly used for closing the lock; but the locks have been heretofore compressed by hand, with a mallet, after being removed from the machine. It is immaterial whether the pressure-roller J is placed in front or in the rear of the roller F, or what mechanical devices are employed to operate the same, provided their combination is maintained, so as to produce substantially the same effect. By his improvement the locks are compressed before being removed from the machine and immediately after they are closed. Much time and labor are consequently saved by its use.

What is claimed as new, and desired to secure by Letters Patent, is—

The combination of the groover-roller F and the pressure-roller J, when combined and arranged so as to be moved simultaneously by the rack-bar E, (or its equivalent,) substantially as described and for the purposes set forth.

S. STOW MFG. CO.
ENOS E. STOW,
*President.*
O. W. STOW,
*Secretary.*

Witnesses:
JAMES SHEPARD,
C. A. SHEPARD.